Oct. 30, 1934.  A. F. BODINE  1,979,219
BEVERAGE COOLER
Filed July 31, 1933    2 Sheets-Sheet 2
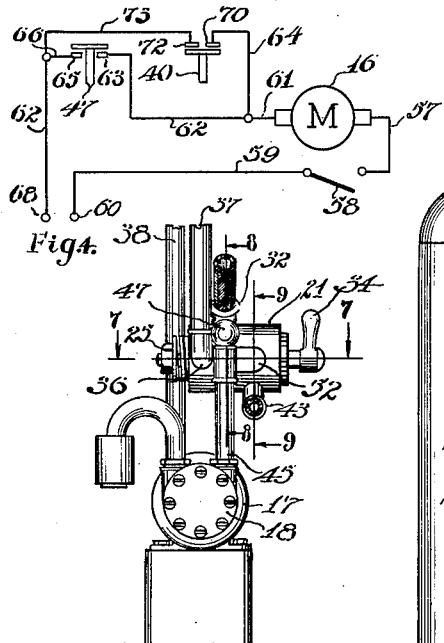
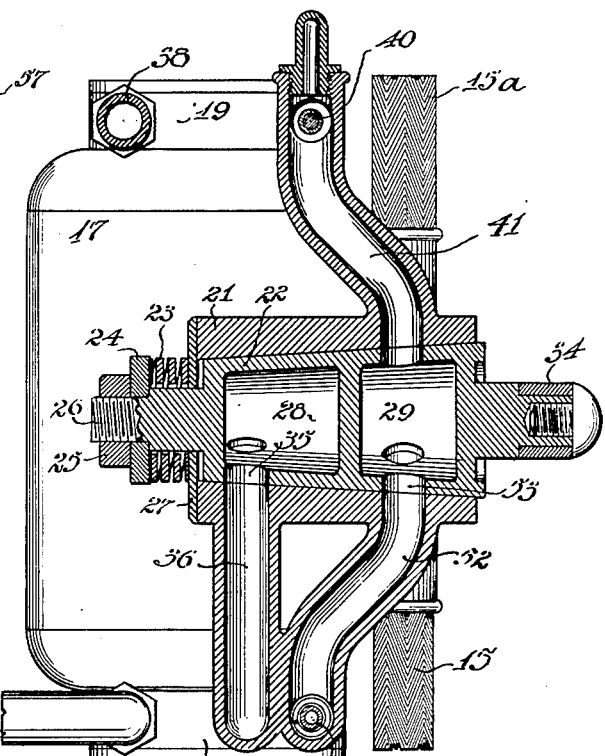
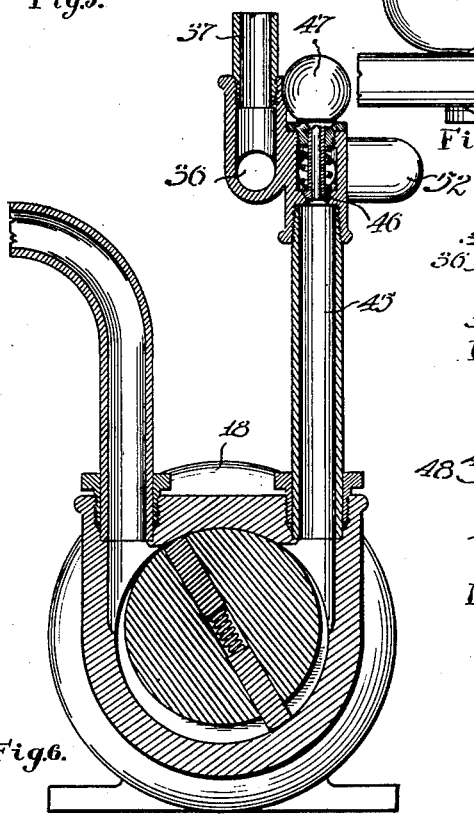
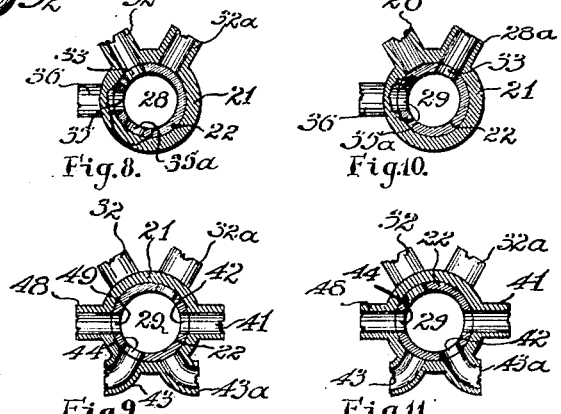
INVENTOR
Arthur F. Bodine
BY *Johnson and Kane*
ATTORNEYS Patented Oct. 30, 1934

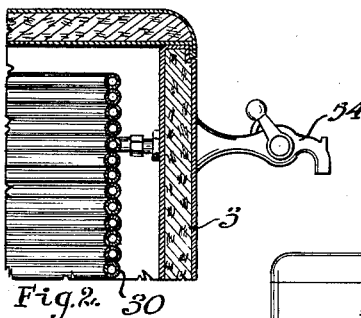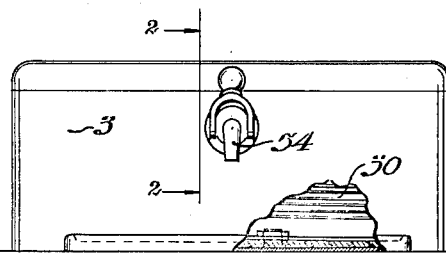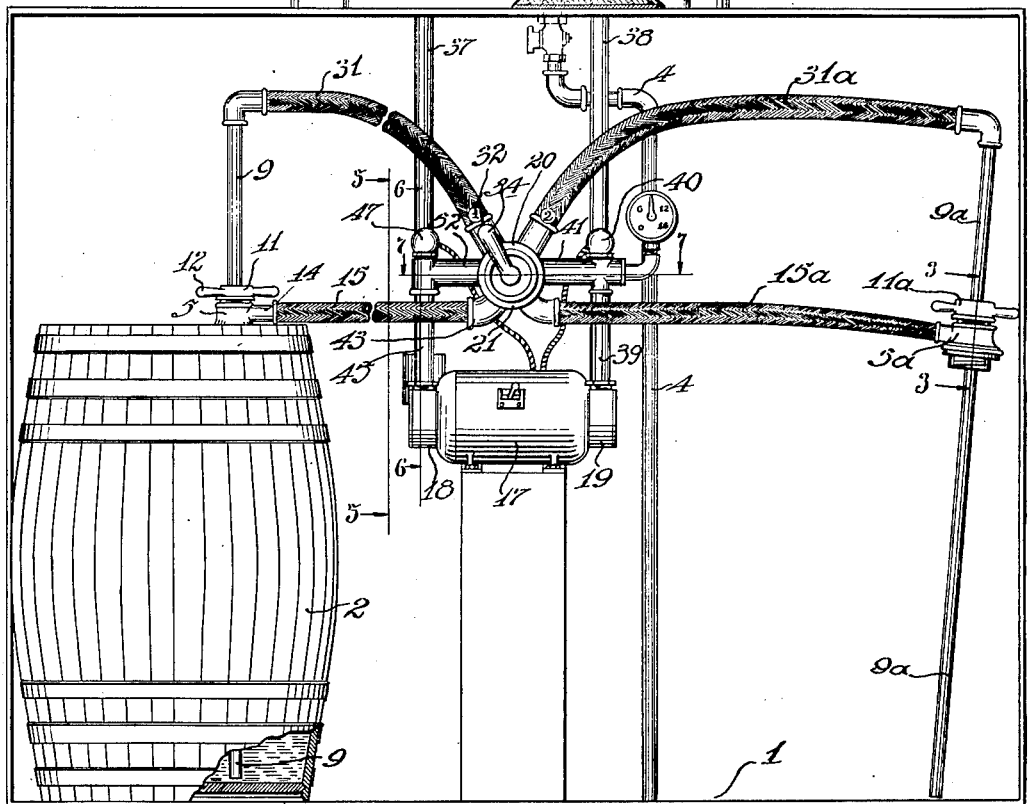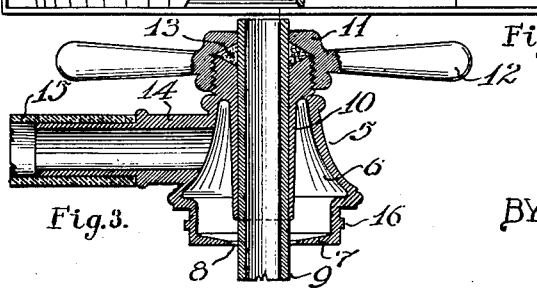

1,979,219

UNITED STATES PATENT OFFICE 1,979,219

BEVERAGE COOLER

Arthur F. Bodine, North St. Paul, Minn.

Application July 31, 1933, Serial No. 683,009

5 Claims. (Cl. 225—1)

The present invention relates to a beverage cooler and dispenser and is particularly adapted to the cooling of beverages within a container, such as a barrel, and, if desired, the dispensing of beverage therefrom.

An object of the present invention is to make an improved and simplified beverage cooling device.

Another object is to circulate a beverage from a container through a cooling element and back into the container and the provision of means for dispensing of beverage from the device, and the provision of means for maintaining a required pressure interiorly of the container.

These and other features of the invention will be more fully brought out in the following description and the accompanying drawings, wherein:

Figure 1 is a view in rear elevation of a beverage cooling and dispensing cabinet embodying the present invention.

Figure 2 is a fragmentary sectional view on the line 2—2 of Figure 1.

Figure 3 is a sectional view on the line 3—3 of Figure 1.

Figure 4 is a schematic circuit drawing showing an electric motor circuit having pressure and temperature control elements embodied therein.

Figure 5 is a sectional view on the line 5—5 of Figure 1.

Figure 6 is a sectional view on the line 6—6 of Figure 1.

Figure 7 is a sectional view on the line 7—7 of Figure 5.

Figure 8 is a fragmentary sectional view on the line 8—8 of Figure 5.

Figure 9 is a sectional view on the line 9—9 of Figure 5.

Figures 10 and 11 are views similar to Figures 8 and 9, respectively, showing a valve mechanism in a different position from that of Figures 8 and 9.

Referring to the drawings in detail, a cabinet 1 is of a size to receive two beverage barrels, such as the barrel 2 therein. The cabinet 1 is not necessarily insulated and may even be open on its rear side, as shown, although, if preferred, this rear side of the cabinet may be closed by a door or panel, not shown, in a well known manner, to improve the appearance of the device.

A cooling chamber 3 adapted to contain a quantity of ice, not shown, is mounted on top of the cabinet 1 and is of thermally insulated construction, the chamber being of water-tight construction and being provided with a drain pipe 4 which may be connected to a sewer outlet, not shown, to dispose of waste water resulting from the melting of ice in the chamber 3. A bung tap 5 is in general of a conventional type, but with minor novel features to adapt it for the purpose intended. The tap comprises a recessed base 6 having an inwardly projecting annular flange 7 at the lower end thereof, the flange 7 having a central opening 8 therein of larger diameter than that of a tube 9 slidably mounted in a cylindrical support 10 formed integrally at its upper end with the recessed base portion 6. The upper portion of the recessed member 6 is threaded to threadedly receive a compression nut 11 having handles 12 thereon to facilitate the manipulation of the compression nut 11. A packing ring 13 is provided between the nut 11 and the recessed member 6. Upon tightening of the compression nut 11 the packing 13 is forced into close sealing engagement with the tube 9.

An inlet 14 is provided in open communication with the interior of the recessed member 6 and has connected thereto a flexible tube 15, as best shown in Figure 3. An interrupted thread screw 16 is provided around the lower portion of the recessed member 6 and is adapted to have threaded engagement with a bung bushing, not shown, of a conventional type affixed in position in the bung hole of a barrel 2.

An electric motor 17 has an air compressor pump 18 mounted on one end thereof and a liquid circulating pump 19 on the other end thereof. A two-position valve 20 is provided in the present installation, which is adapted to operate from either of two barrels of beverage independently. It will be apparent to those versed in the art, of course, that where it is desired to provide a device to handle but one barrel of beverage at a time that a simpler valve structure of well known type, not illustrated, can be employed.

The valve 20 has a valve housing 21 with a tapered valve member 22 seated therein and held in position therein (see Figure 7) by means of a spring 23, washer 24, and nut 25, which nut is threadedly mounted on an extension 26 of the valve member 22. The spring 23 rests on a plate 27 mounted on the inner end of the valve housing 21. The valve member 22 has two chambers 28 and 29 therein. The inner chamber 28 is provided for the passage of beverage from the barrel 2 to the cooling coil 30 and the outer valve chamber 29 is provided for the return of the beverage from the coil to the barrel and for the admission of compressed air or gas to the circuit.

In Figures 8 and 9 which show sectional views through the inner and outer chambers 28 and 29, respectively, and connected passages, the valve member 22 is shown in position to draw beverage from the barrel 2, and shows the parts in the position they would occupy with the valve in the position "1" illustrated in Figure 1. In Figures 10 and 11 the parts of the valve are shown in similar section with the parts in the position they would occupy with the valve handle moved to the position "2" of Figure 1, to supply beverage from a second barrel, not shown, which may be positioned in the right hand side of the cabinet 1 shown in Figure 1.

The piping and valve circuits for the present embodiment of the invention are as follows; the circuits being described being those for the barrel 2 only, and assuming that the valve is in the position "1" shown in Figures 1, 7, 8, and 9: From the tube 9 a flexible tube 31 is connected to a valve inlet 32 which is in registry with a valve port 33 opening into the forward portion of the inner valve chamber 28 when the valve handle 34 is in the position "1" shown in Figure 1. A valve port 35, also in the inner valve chamber 28, is also in registry with an outlet 36 to which is connected a pipe 37 which in turn is connected to one end of the cooling coil 30 located in the chamber 3. From the other end of the cooling coil 30 a pipe 38 is connected to the intake side of the liquid circulating pump 19. The outlet side of the pump 19 is connected to a pipe 39, connected to the inlet side of a thermostatic switch 40 of a conventional type. To the outlet side of said switch 40 is connected a valve inlet connection 41, which, with the valve in position "1" is in registry with a valve port 42, opening into the valve chamber 29. An outlet 43 from the outer valve chamber 25 is connected to the flexible tube 15 connected to the tap inlet 14, which, with the valve in position "1", is in registry with a port 44 (see Figure 9) in said outer chamber.

From the air compressor pump 18 a pipe 45 is connected through a back pressure valve 46 and a pressure actuated switch 47 of a conventional type, to an inlet 48 which, with the valve in position "1" is in registry with a port 49 in the outer valve chamber 29.

The circulation of beverage from the barrel 2, through the cooling coil and back to the barrel is as follows:

Upon operation of the motor 17, the liquid circulating pump 19 is operated and an increase of pressure produced thereby on the outlet side of said pump and a decrease of pressure is produced on the inlet side of said pump. This induces a flow of beverage from the barrel 2 upwardly through the tube 9, through the tube 31, valve inlet 32, valve port 33, inner valve chamber 29, valve port 35, valve outlet 36, pipe 37, cooling coil 30, pipe 38, pump 19, pipe 39, through the passage in the thermostatic switch 40, valve inlet 41, valve port 42, valve chamber 29, valve port 44, valve outlet 43, tube 15, tap inlet 14, into the interior of the recessed tap base 6. The flange 7 directs the returning liquid upwardly against the exterior of the tube 9 so that the liquid flows by gravity down along the sides of the tube 9 and is thus returned to the barrel without splashing.

It will be noted that as long as the motor 17 is operating, the air pump 18 will continue to function, drawing air from the atmosphere in through an inlet pipe 51, through the pump 18, back pressure valve 46, relief valve and pressure actuated switch 47, through an air inlet 52, through a port 53 into the outer valve chamber 29, thence through port 44, outlet 43, hose 15, tap inlet 14, through the tap and into the barrel. The liquid in the inlet 41, pipe 39, liquid pump 19, and the pipe 38 forms a trap which prevents incoming air from being forced up into the coil 30.

A faucet 54 is connected to the coil 30 to permit the drawing of beverage from the circuit at will. If desired, the faucet may be eliminated as may also the air pump 18 when a mechanism for merely cooling beverage in a container is required, since, with a tap such as that illustrated, a barrel may be tapped without the loss of gas or air therefrom. The beverage may when cooled be dispensed from an ordinary dispenser or bar in a well known manner.

While the specific type of tap and liquid circulator illustrated and described herein has been found effective, it will be apparent to those versed in the art that any suitable means of circulating the beverage through a cooling coil and returning it to the barrel may be effectively employed.

When it is desired to cool the beverage a barrel positioned in the right hand side of the cabinet 1, a tap 5—a is inserted in a second barrel, not shown, and a tube 9—a is forced downwardly in the barrel in a well known manner, and locked in position by a compression nut 11—a. The beverage circulates through the tube 9—a, a tube 31—a, thence through the valve and piping as described for the circuit for the barrel 2, and is returned to the right hand barrel through a tube 15—a.

This second circuit will be readily understood by noting the position of the valve as shown in Figures 10 and 11, since the reference characters for the parts for the right hand barrel are the same as those for the left hand barrel with the exception of the suffix letters "a". In view of this it is believed unnecessary to describe the circuit for the right hand barrel in detail.

A preferred electrical circuit for the mechanism is shown in Figure 12, wherein the motor 16 is connected by means of a conductor 57 to a manually operated switch 58, conductor 59, to one side of a supply of electric current 60. The other side of the motor is connected in parallel through the pressure actuated switch 47 and the thermostatic switch 40, respectively. This method of connecting the circuits is as follows:

A conductor 61 is connected to the other side of the motor and to a conductor 62 which is connected to one terminal 63 of the pressure actuated switch 47. The other terminal 65 of the pressure actuated switch is connected by means of a conductor 66 to a conductor 67 which is connected to the other terminal 68 of the electrical supply circuit. Also connected to the conductor 61 is a conductor 69 which is connected to one terminal 70 of the thermostatically actuated switch 40, the other terminal 72 of which is connected to a conductor 73, connected to the conductor 67, which in turn is connected to the terminal 68 of the current supply circuit.

It will thus be seen that when either the pressure in the liquid circuit falls below the predetermined minimum controlled by the adjustment of the pressure actuated switch 47, or when the temperature rises beyond the predetermined maximum controlled by the adjustment of the thermostatic switch 47, that a circuit will be closed through the motor 16, provided the circuit is placed in operative condition by first closing the manually controlled switch 58.

The device comprises a simple and effective means for the cooling of a beverage in a con-

I claim:

1. A beverage cooling and dispensing device, comprising means adapted to withdraw beverage from a sealed container, a cooling coil connected to said withdrawing means, return means adapted to return said beverage to said container, a faucet connected to discharge beverage from said device and pressure means connected to said circuit to maintain a pressure above atmospheric pressure on the beverage in said circuit.

2. A beverage cooling device, comprising a cabinet adapted to receive a sealed beverage container, a coil mounted exteriorly of said beverage container, liquid supply means having an opening therein adapted to be inserted in said container below the liquid level of said container and connected to said coil, return means connected to said coil and to said beverage container, circulating means mounted to circulate beverage from said container through said supply means, said coil and said return means back to said container, pressure means mounted to maintain a predetermined pressure above atmospheric pressure on said beverage and cooling means associated with said coil to cool said coil and beverage contained therein.

3. The method of cooling a beverage in a normally sealed container which comprises withdrawing a portion of beverage from said container, cooling it and returning it to said container in a closed, hermetically sealed, circulatory cycle simultaneously maintaining a pressure in said circuit above atmospheric pressure.

4. A beverage cooling device comprising a supply tube insertable in a beverage container to have an opening thereof below the liquid level thereof, sealing means to hermetically seal said tube with respect to said container, a cooling coil having an end thereof connected in hermetically sealed relation to said tube, a return tube from a secondary point in said cooling coil and having hermetically sealed conducting means opening into said beverage container, cooling means associated with said coil to cool beverage contained therein, circulatory means mounted to circulate a beverage from said container through said cooling coil and back to said container to return the cooled beverage to said container, a two-way, two-circuit valve connected in open communication with the supply line from said barrel to said cooling coil and with the return line from said coil to said barrel, respectively, a second supply and return line adapted to be similarly mounted in a second beverage container, separate from said first, said supply line being connected to said valve to be normally closed when said valve is in position to open said first supply line to said coil, said second return line being connected to said valve to be normally closed when said valve is in position to return to said first barrel, said valve having a secondary position opening said secondary supply and return lines to said circuit, said first supply and return lines being closed to said circuit, with said valve in said secondary position.

5. A beverage cooling device comprising a supply tube insertable in a beverage container to have an opening thereof below the liquid level thereof, sealing means to hermetically seal said tube with respect to said container, a cooling coil having an end thereof connected in hermetically sealed relation to said tube, a return tube from a secondary point in said cooling coil and having hermetically sealed conducting means opening into said beverage container, cooling means associated with said coil to cool beverage contained therein, circulatory means mounted to circulate a beverage from said container through said cooling coil and back to said container, and pressure means connected to said circuit to maintain a pressure above atmospheric pressure on the beverage in said circuit.

ARTHUR F. BODINE.